Jan. 22, 1957  V. J. REDMOND  2,778,215
LOCK DEVICE FOR AUTOMOBILE WHEEL PLATES
Filed March 24, 1954  3 Sheets-Sheet 1
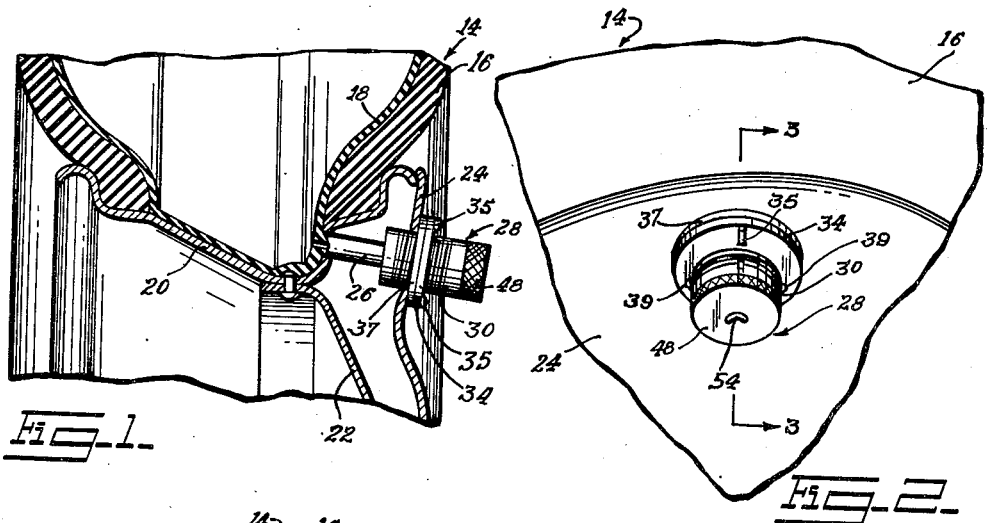
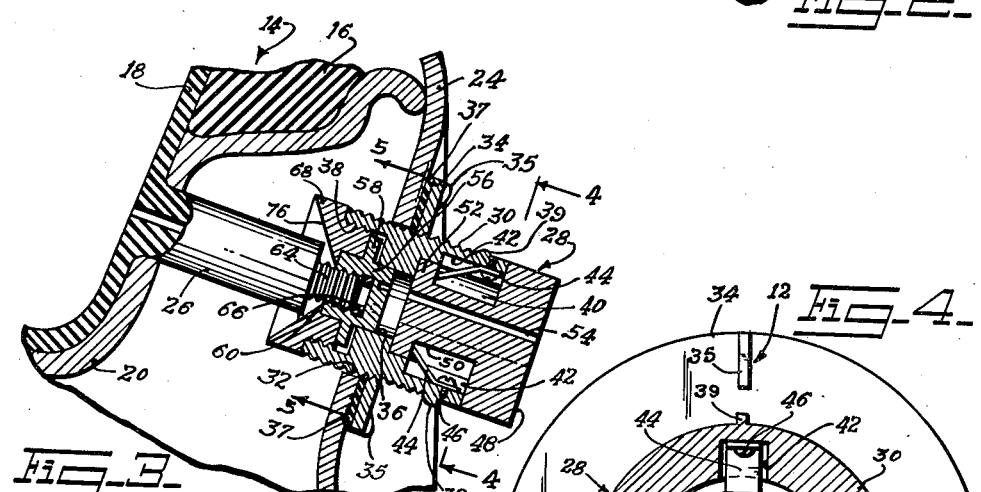
INVENTOR.
VINCENT J. REDMOND
BY
ATTORNEY Jan. 22, 1957 V. J. REDMOND 2,778,215
LOCK DEVICE FOR AUTOMOBILE WHEEL PLATES
Filed March 24, 1954 3 Sheets-Sheet 3

INVENTOR.
VINCENT J. REDMOND
BY
ATTORNEY

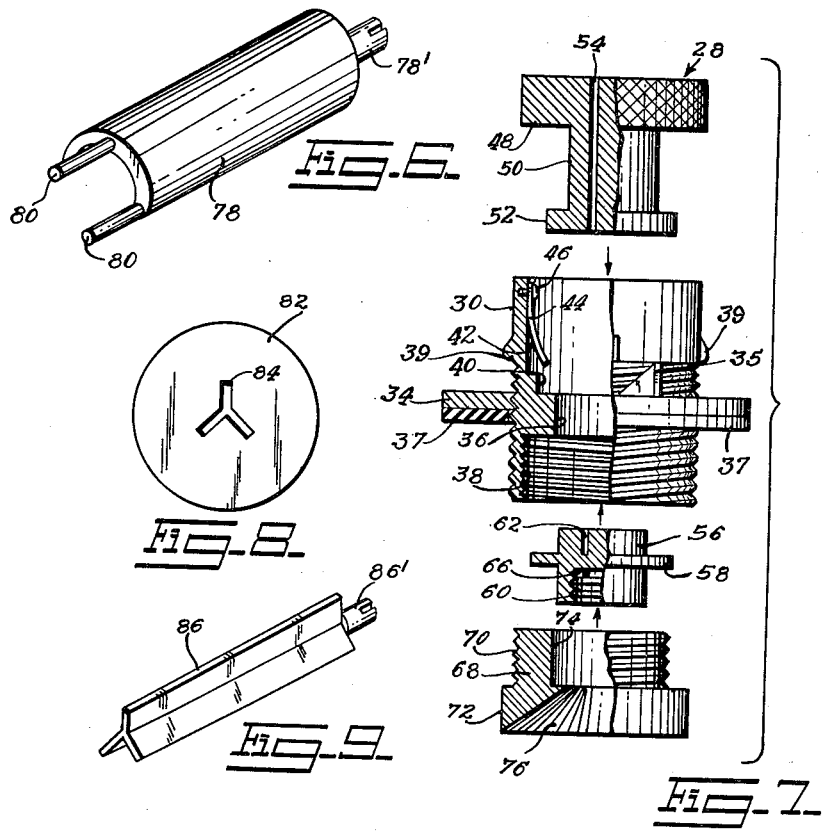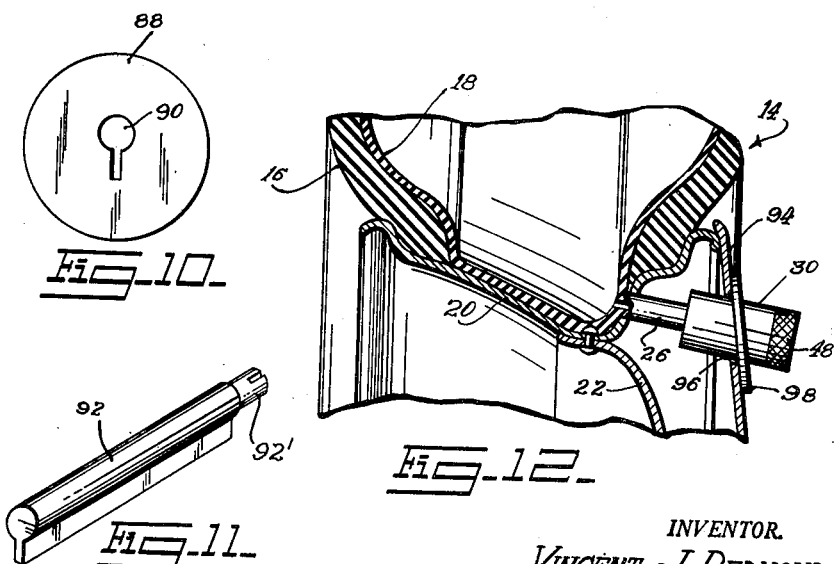

United States Patent Office 2,778,215
Patented Jan. 22, 1957

2,778,215
LOCK DEVICE FOR AUTOMOBILE WHEEL PLATES

Vincent J. Redmond, Bronx, N. Y.

Application March 24, 1954, Serial No. 418,359

6 Claims. (Cl. 70—231)

This invention relates to a locking device applicable to the tire valve of an automobile wheel in such a way as to cause a lock flange or collar of the device to bear against an adjacent portion of the trim ring or disc of the wheel, thus to prevent unauthorized removal of said ring or disc.

The use of trim rings, plates, or discs on automobile wheels, to enhance the appearance thereof, is becoming more and more widespread, and in view of the substantial cost of these articles, it is desirable to provide some means whereby they will be effectively locked in place, thus to prevent theft of the same. At the same time, it is essential in a locking device of the nature referred to that it be capable of manufacture at a relatively low cost, that it be relatively inconspicuous, that it be made as tamperproof as possible, and that it be applicable to a wheel with maximum ease and speed.

The main objects of the present invention are to provide a locking device which will have all the desirable features above noted.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a fragmentary view taken transversely through a vehicle wheel, in which the locking device is shown in side elevation.

Fig. 2 is a fragmentary elevational view of the wheel and locking device taken from the right of Fig. 1.

Fig. 3 is an enlarged longitudinal sectional view through the device taken substantially on line 3—3 of Fig. 2.

Fig. 4 is a transverse sectional view, still further enlarged, on line 4—4 of Fig. 3.

Fig. 5 is a transverse sectional view on the same scale as Fig. 4, taken on line 5—5 of Fig. 3.

Fig. 6 is a perspective view of a key used for locking and unlocking the device.

Fig. 7 is an exploded view of the device in which the parts are shown partly in section and partly in elevation.

Fig. 8 is a plan view of a modified form of cap which may be used in the device.

Fig. 9 is a perspective view of a locking key that is used with the cap of Fig. 8.

Fig. 10 is a plan view of another modified cap.

Fig. 11 is a perspective view of a key that can be used with the cap of Fig. 10.

Fig. 12 is a view similar to Fig. 1, showing a modified form of locking device used with a different type of trim plate.

Figure 13:
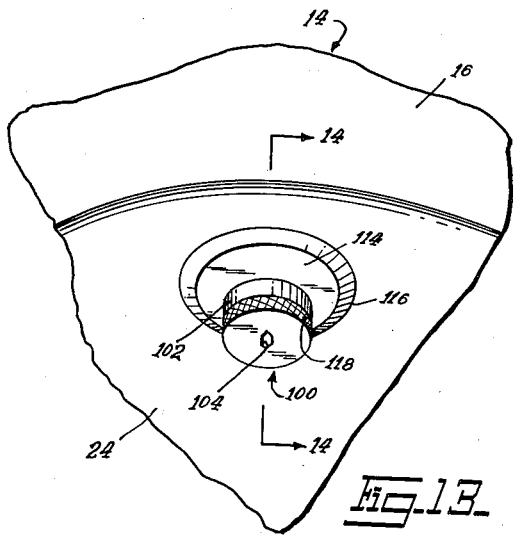
Fig. 13 is a view similar to Fig. 2, showing another modification.

A conventional automobile wheel 14 is shown in the drawings, and includes a casing 16, having therein a tube 18. These are mounted on a drop center rim 20 secured to the periphery of the disc-like body 22 of the wheel. An ornamental and protective trim disc or wheel plate 24 is mounted on the body 22 to cover the same, and overlies the valve 26 of the wheel.

The locking device constituting the invention is applied to the valve and bears against the trim disc 24 to lock the same against theft. The device has been generally designated 28 and as best shown in Fig. 7 includes a hollow cylindrical body portion 30 which, like other exposed parts of the trim disc lock, can be chrome plated or otherwise externally treated to improve its appearance and cause it to blend in with the similarly treated disc 24.

The body portion 30 is mounted in an opening 32 of the wheel disc 24 the diameter of which corresponds to the external diameter of the body portion, and formed on the body portion are threads engaging internal threads of an annular locking flange or collar 34 which, as shown in Fig. 3, bears tightly against the marginal part of the wheel disc to prevent unauthorized removal thereof from the wheel. Collar 34 has lugs 35 or equivalent means to facilitate application or removal thereof, and a gasket 37 is interposed between the collar and disc.

Body portion 30 has an axial bore 36 intermediate its ends communicating at the inner end of the body portion with a threaded counterbore 38, and communicating at the outer end of the body portion with a smooth-walled counterbore 40.

To prevent unauthorized removal of the locking flange 34, a circumferential series of stop lugs 39 is formed on the body portion, said lugs being spaced 90° apart in the present instance.

In the wall of the counterbore 40, at diametrically opposite locations therein (Fig. 4), longitudinal recesses 42 are provided, and anchored at one end within the recesses are leaf springs 44, said springs being anchored by screws 46 threaded into the inner walls of the recesses. The springs are tensioned so that the free ends thereof normally project out of the recesses into the counterbore, adjacent the shoulder defined within the body by the merger of the bore 36 into the counterbore 40.

A cap 48 is formed at its outer end with a knurled head, corresponding in diameter to the external diameter of the body portion and formed integrally with an axial extension 50 smaller in diameter than the diameter of counterbore 40. Extension 50 is integral, at that end thereof remote from the knurled head, with a circumferential collar 52, which seats against the above mentioned internal shoulder of the body portion.

When the cap is extended into the counterbore as shown in Fig. 3, it is freely rotatable at all times, and as will be noted, the initial insertion of the cap is adapted to force the free ends of the springs into the recesses 42, after which said free ends spring back out of the recesses as soon as the collar 52 has passed by the free ends. The free ends of the springs will now overlie the collar 52 as shown in Figs. 3 and 4, and will thereafter serve to prevent the removal of the cap while still permitting free rotation thereof at all times.

Formed in the cap, and extending axially thereof from end to end of the same, is a key slot 54 of semi-circular-shaped cross-section, usable in a manner to be made fully apparent hereinafter.

Also mounted in the body is a cap nut 56 of cylindrical shape, having a smooth outer surface and proportioned to the diameter of the bore 36, so as to be rotatable in said bore. Cap nut 56, intermediate its ends, is formed with a circumferential flange 58. One end of the cap nut is closed, and in the other end thereof is formed a threaded, axial recess 60. The closed end wall is formed with spaced apertures 62 registering, as shown in Fig. 4, with the semi-circular-shaped key slot.

The cap nut, as best shown in Fig. 3, serves as a closure for the valve 26, being threaded upon the stem 64 of the valve in substitution for the conventional valve cap ordinarily employed. An annular washer 66 of rubber or the like, is seated in the inner end of the recess 60 to prevent leakage of air from the tube 18.

Mounted in the inner end of the body portion 30 is a plug 68 having external threads 70 engaging the threads of counterbore 38. When the plug 68 is threaded into the counterbore to its maximum extent, a collar 72 formed on the outer end thereof engages against the adjacent end of the body portion, and in this position of the parts, there will be defined an annular space between the inner end of the plug and an internal shoulder defined in the body portion by the differing diameters of bore 36 and counterbore 38. The flange 58 of the cap nut seats loosely in this space as shown in Fig. 3, and the cap nut is thus mounted for free rotation relative to the body portion and plug.

The plug is formed at its inner end with an axial, smooth-walled bore 74 in which the inner end portion of the cap nut is rotatably engaged, and bore 74 merges into a flared bore portion 76 at the outer end of the plug. Bore portion 76 serves the function of guiding the valve stem 64 to the cap nut recess 60 when the device is being mounted upon the valve stem.

Referring now to Fig. 6, there is here shown a key 78 shaped for insertion in the key slot 54. The key can be formed simply from a length of sheet metal material bent transversely to impart a semicircular cross-sectional shape to the body of the key. At one end the key is formed with parallel, straight projections 80 spaced correspondingly to apertures 62 of the cap nut, and thus, when the key is inserted through the key slot and turned until its projections engage in apertures 62, the cap 48 and the cap nut 56 will be connected by the key for joint rotation. One can then grasp the knurled head of the cap and rotate the same in a selected direction for threading the cap nut onto the valve stem or disengaging the cap nut from said stem, whichever is desired.

At the other end of the key 78 is a valve stem turning member 78' for use to tighten or loosen the valve stem (not shown) of the tire tube 18.

It will be understood that the particular shape of the key slot 54, and the use of the spaced apertures 62 in conjunction therewith, are illustrated to show one type of construction that may facilitate manufacture of the device while hampering efforts by a would-be thief to fashion a suitable key and remove the wheel disc. The apertures could be in any number and spacing desired, and possibly, instead of the two apertures, an opening of semi-circular-shape corresponding to the key slot, might be used. Or, the key slot might be of rectangular cross-section, with a single aperture of rectangular cross-section, but smaller in size than the cross-sectional area of the key slot, being formed in the cap nut. This is thought sufficiently obvious as not to require special illustration herein.

In Fig. 8, there is shown a modified form of cap designated by the reference number 82 and having a keyway or slot 84 of Y-shaped cross-section. The key insertable in said keyway has been designated 86 and is shown in Fig. 9 as having a cross-sectional shape complementing that of the keyway. The cap nut would have a similarly shaped aperture receiving the inner end of the key 86. The outer end of key 86 contains a valve stem turning member 86' adapted to tighten or loosen the valve stem (not shown) of a tire tube.

In Fig. 10, the cap is designated 88, and has a keyway 90 shaped as a keyhole opening to receive a complementarily shaped key 92 shown in Fig. 11. The key 92 is also provided with a valve stem turning member 92' to tighten or loosen a tire tube valve stem.

In Fig. 12, there is shown a modified construction in which the device is usable with a trim plate or disc 94 having a curved section at the location of the lock-device-receiving opening 96 thereof, the plate having this portion thereof lying obliquely to the axis of the locking device when the device is applied to the valve. In such an instance, the body portion, cap, cap nut, and plug would be unchanged, but the locking flange 98 would be fixedly secured to the body portion in a plane oblique to the axis of the device, rather than in a plane normal to said axis as in the first form of the invention. It is thought obvious, in view of the example shown in Fig. 12, that the flange could be otherwise positioned, and could itself be curved or cambered, to engage tightly against a correspondingly shaped wheel plate.

In use of the device, and assuming that the wheel plate is to be locked in position, the valve stem is guided to the recess of the cap nut, the device being previously fully assembled during the manufacture thereof. The key is then inserted, after which rotation of the knurled head of the cap will serve to thread the cap nut tightly onto the valve stem, the locking flange being thus shifted against the wheel disc to bear tightly thereagainst and thus prevent unauthorized removal. The key is then removed, and subsequent efforts at theft will be hampered to such an extent as to substantially rule out this possibility, it being obvious that the thief would need a properly shaped key to effect the unauthorized removal of the wheel disc. Should one try to rotate the body portion bodily, it would still not be possible to remove the device, since the cap nut would be freely rotatable relative to the body portion and plug at all times.

It will be understood that in some instances the locking flange 34 might be made integral with the body portion 30 or otherwise secured thereto in an unchanging location. However, the threaded connection shown is favored because it permits adjustment of the locking flange longitudinally of the body portion, to compensate for varying distances between the wheel plate and valve stem that might be encountered in different makes of vehicles.

Figure 14:
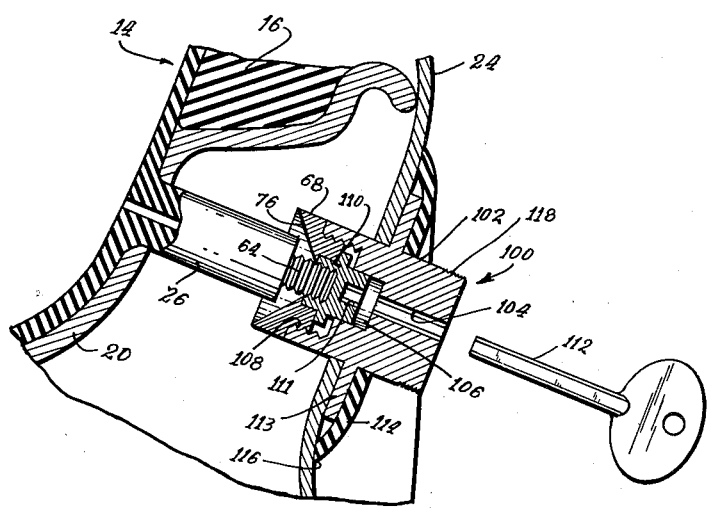
Fig. 14 is an enlarged sectional view on line 14—14 of Fig. 13.

In Figs. 13 and 14 there is shown another modification designated generally at 100. This includes a cylindrical body portion 102 having an axial, noncircular bore 104 which in the illustrated example but not necessarily is formed to a hexagonal cross section. Bore 104 opens at one end upon the outer end surface of body portion 102. At its other end it opens into a smoothwalled counterbore 106 of the body portion, and counterbore 106 in turn opens into a threaded counterbore 108 of still greater diameter.

A cylindrical cap nut 110, threadedly engaged with the valve stem, is similar in all respects to cap nut 56, except for having a centrally disposed key-receiving socket 111 aligned with key slot 104 and formed to a cross section matching that of the slot or bore 104. Cap nut has a smoothwalled surface proportioned to the diameter of counterbore 106 so as to be rotatable in said counterbore.

The cap nut is held in place in the body portion by the plug 68 which is threadedly engaged in counterbore 108.

A key 112, having a shank mating with the bore 104 and socket 111, is extendable into said bore and socket whenever the device is to be installed or removed by the owner or by someone acting under his authority.

Integrally formed on the body portion is a circumferential locking flange 113 bearing against wheel disc 24. A protective rubber washer 114 is applied to the body portion over the locking flange to cover the same. The washer is substantially greater in diameter than the flange and has its peripheral portion shaped to extend into engagement with the surface of the wheel disc. Said peripheral portion is beveled as at 116 to merge smoothly into the surface of the disc.

On the outer end of the body portion 102, knurling 118 or its equivalent is provided.

In use of the device, and assuming that it is being installed on the valve, the key 112 is first inserted, and acts to lock the cap nut and the body portion together for joint rotation. The body portion may now be grasped at its knurled part and rotated manually in a direction to threadedly engage the cap nut with the valve and force the locking flange 113 into engagement with the wheel disc. The key is now removed, and any further attempts to rotate the body portion in either direction will cause said rotation to be unavailing, since the cap nut will remain stationary, in engagement with the valve stem, and will prevent unauthorized removal of the device and of the wheel disc.

To remove the valve cap and locking device, the key is reinserted to connect the cap nut and body portion for joint rotation. The body portion is now rotated manually in a reverse direction, to back the cap nut off the threads of the valve.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A device for locking a wheel plate upon an automobile wheel having a valve, comprising a body portion, means thereon adapted to bear against said wheel plate to prevent movement thereof in a direction outwardly of said wheel, a cap nut rotatably mounted in the body portion and threadedly engaged with said valve, said cap nut having an opening of arcuate shape adapted to receive a key of like configuration, a cap rotatable on the body portion, said cap having a semi-circular-shaped slot aligned with said apertures, a plug mounted in the body portion to hold the cap nut in place therein, the body portion being tubularly formed from end to end with the cap and plug being engaged in opposite ends thereof, and with the cap nut being disposed between said cap and plug, the cap being freely rotatable in its associated end of the body portion and the plug being made rigid with the body portion at the other end thereof.

2. A device for locking a wheel plate upon an automobile wheel having a valve, comprising a body portion, means thereon adapted to bear against said wheel plate to prevent movement thereof in a direction outwardly of said wheel, a cap nut rotatably mounted in the body portion and threadedly engaged with said valve, said cap nut having an opening of arcuate shape adapted to receive a key of like configuration, a cap rotatable on the body portion, said cap having a semi-circular-shaped slot aligned with said apertures, a plug mounted in the body portion to hold the cap nut in place therein, the body portion being tubularly formed from end to end with the cap and plug being engaged in opposite ends thereof, and with the cap nut being disposed between said cap and plug, the cap being freely rotatable in its associated end of the body portion and the plug being made rigid with the body portion at the other end thereof, the cap nut being formed with a circumferential collar rotatably seating upon the plug.

3. A device for locking a wheel plate upon an automobile wheel having a valve, comprising a body portion, means thereon adapted to bear against said wheel plate to prevent movement thereof in a direction outwardly of said wheel, a cap nut rotatably mounted in the body portion and threadedly engaged with said valve, said cap nut having an opening of arcuate shape adapted to receive a key of like configuration, a cap rotatable on the body portion, said cap having a semi-circular-shaped slot aligned with said apertures, a plug mounted in the body portion to hold the cap nut in place therein, the body portion being formed with an axial bore in one end of which the cap is engaged, said cap including a head disposed exteriorly of the bore for gripping of the head by a user when the cap is to be rotated with the cap nut.

4. A device for locking a wheel plate upon an automobile wheel having a valve, comprising a body portion, means thereon adapted to bear against said wheel plate to prevent movement thereof in a direction outwardly of said wheel, a cap nut rotatably mounted in the body portion and threadedly engaged with said valve, said cap nut having an opening of arcuate shape adapted to receive a key of like configuration, a cap rotatable on the body portion, said cap having a semi-circular-shaped slot aligned with said apertures, a plug mounted in the body portion to hold the cap nut in place therein, the body portion being formed with an axial bore in one end of which the cap is engaged, said cap including a head disposed exteriorly of the bore for gripping of the head by a user when the cap is to be rotated with the cap nut, the body portion having diametrically opposite recesses communicating with the bore, said body portion including springs mounted in the recesses and tensioned to project therefrom into the bore, the cap including a collar within the bore over which the springs project to prevent separation of the cap and body portion.

5. A device for locking a wheel plate upon an automobile wheel having a valve, comprising a body portion, means thereon adapted to bear against said wheel plate to prevent movement thereof in a direction outwardly of said wheel, a cap nut rotatably mounted in the body portion and threadedly engaged with said valve, said cap nut having an opening of arcuate shape adapted to receive a key of like configuration, a cap rotatable on the body portion, said cap having a semi-circular-shaped slot aligned with said apertures, a plug mounted in the body portion to hold the cap nut in place therein, the body portion being formed at one end with a threaded counterbore, the plug being threaded for engagement in said counterbore, the cap nut having a threaded recess and the plug being formed with a flared bore portion communicating with said recess so as to guide the valve to the recess of the cap nut.

6. In a device of the kind described, a tubular body having a counterbore at each end thereof, internal threads on the outer extreme end of one of said counterbores, a plug member threaded into the threaded end of said counterbore, said plug member having an axial opening therethrough, a cap member swivelly mounted in the other counterbore, said cap member having a semi-circular slot extending therethrough, and a cap nut swivelly mounted in the threaded counterbore between the plug member and the base of said counterbore, said cap nut having a central threaded opening in line with the axial opening in the plug member, and having spaced apertures arranged in the form of an arc in alignment with the semi-circular slot in the cap member whereby said slot and apertures are arranged to receive a key with a body of like configuration having end projections.

References Cited in the file of this patent

UNITED STATES PATENTS

| | | |
|---|---|---|
| 1,642,589 | Loomis | Sept. 13, 1927 |
| 1,685,924 | Lee | Oct. 2, 1928 |
| 1,870,427 | Stallings et al. | Aug. 9, 1932 |
| 2,076,789 | Le Jeune | Apr. 13, 1937 |
| 2,359,639 | Hanahan | Oct. 3, 1944 |
| 2,648,971 | Jones | Aug. 18, 1953 |

FOREIGN PATENTS

| | | |
|---|---|---|
| 965,297 | France | Feb. 15, 1950 |